United States Patent Office 2,712,021
Patented June 28, 1955

2,712,021
GLUCURONOLACTONE REACTION PRODUCT

Leon E. Tenenbaum, Brooklyn, N. Y., assignor to Nepera Chemical Co., Inc., Nepera Park, Yonkers, N. Y., a corporation of New York No Drawing. Application September 25, 1953, Serial No. 382,481

4 Claims. (Cl. 260—295)

This invention relates to a novel compound comprising the reaction product of isonicotinyl hydrazine and glucuronolactone in which two mols of isonicotinyl hydrazine are combined with each mol of glucuronolactone in forming said novel reaction product. The novel compound of my invention is useful therapeutically as an orally active anti-tubercular agent. This novel compound has a high therapeutic index and is free from many of the undesirable side effects caused by the continued administration of isonicotinyl hydrazine itself.

An object of this invention is the preparation of an antitubercular compound useful for oral administration and which may be administered in relatively high dosages without undesirable side effects.

Other objects of this invention will appear from the following detailed description.

The novel compound of my invention may be conveniently prepared by reacting isonicotinyl hydrazine and glucuronolactone, with said reactants being employed in a ratio of two mols of isonicotinyl hydrazine to each mol of glucuronolactone. The reaction is preferably carried out with the aid of a suitable inert solvent, such as, for example, a pyridine. The reaction temperature preferably employed may be from about 60° to about 100° C. Usually, the isonicotinyl hydrazine and glucuronolactone are added to the solvent, e. g., pyridine, and the desired reaction may be effected by heating the mixture obtained on a steam bath for about 2 to 8 hours. After heating has been completed, the mixture is allowed to stand at room temperature for 2 to 24 hours and the precipitate which has formed is filtered off. The precipitate is digested several times with boiling ethanol, the product filtered, then washed with ether and dried.

In order further to illustrate my invention but without being limited thereto, the following example is given:

Example 500 grams of isonicotinyl hydrazine (3.66 mols) and 322 grams of glucuronolactone (1.83 mols) are added to 2,000 ml. of pyridine and the mixture heated on the steam bath for 2.5 hours to dissolve the reactants. Heating is continued for 4 hours longer at the same temperature and a precipitate forms, after which heating is continued for ½ hour longer. The reaction mixture is then cooled to about 20° C. and allowed to stand for 24 hours. The precipitate is filtered off and digested about 3 times with boiling ethanol. The precipitate is finally filtered, washed with ether and then dried. The product obtained is a pale yellow solid which melts with decomposition at 228–230° C. The product comprises the isonicotinyl hydrazide-isonicotinyl hydrazone of glucuronic acid and is believed to correspond to the following formula:

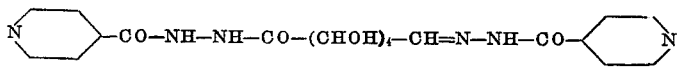

It is understood that the foregoing detailed description is given merely by way of ollustration and that many variations may be made therein without departing from the spirit of my invention.

Having described my invention, what I desire to secure by Letters Patent is:

1. As a new product, the isonicotinyl hydrazone-isonicotinyl hydrazide of glucuronic acid corresponding to the formula:

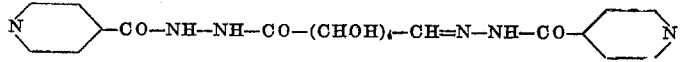

and comprising a pale yellow solid melting at 228–230° C.

2. Process for the preparation of a novel compound, which comprises reacting isonicotinyl hydrazine with glucuronolactone in a ratio of two mols of said isonicotinyl hydrazine to one mol of glucuronolactone employing an inert organic solvent as the reaction medium.

3. Process for the properation of a novel compound, which comprises reacting isonicotinyl hydrazine with glucuronolactone in a ratio of two mols of said isonicotinyl hydrazine to one mol of glucuronolactone employing pyridine as the reaction medium.

4. Process for the preparation of a novel compound, which comprises reacting isonicotinyl hydrazine with glucuronolactone in a ratio of two mols of said isonicotinyl hydrazine to one mol of glucuronolactone employing pyridine as the reaction medium and a reaction temperature of 60 to 100° C.

No references cited.